(12) United States Patent
McLaughlin et al.

(10) Patent No.: US 10,135,859 B2
(45) Date of Patent: Nov. 20, 2018

(54) AUTOMATED SECURITY ENCLAVE GENERATION

(71) Applicant: Cisco Technology, Inc., San Jose, CA (US)

(72) Inventors: Mark-David McLaughlin, Franklin, MA (US); Rajidi P. Reddy, Chapel Hill, NC (US); Omar Santos, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 262 days.

(21) Appl. No.: 15/145,408

(22) Filed: May 3, 2016

(65) Prior Publication Data

US 2017/0324765 A1 Nov. 9, 2017

(51) Int. Cl.
*H04L 29/06* (2006.01)

(52) U.S. Cl.
CPC .......... *H04L 63/1441* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 8,613,080 B2* | 12/2013 | Wysopal | G06F 11/3612 726/19 |
| 9,021,589 B2 | 4/2015 | Anderson et al. | |
| 9,043,894 B1 | 5/2015 | Dennison et al. | |
| 9,087,324 B2 | 7/2015 | Osipkov et al. | |
| 9,100,428 B1 | 8/2015 | Visbal | |
| 9,906,561 B2* | 2/2018 | Jain | H04L 61/256 |
| 2005/0015471 A1* | 1/2005 | Zhang | H04L 63/0442 709/221 |
| 2007/0087756 A1* | 4/2007 | Hoffberg | G06Q 10/0631 455/450 |
| 2007/0106754 A1* | 5/2007 | Moore | G06F 17/3089 709/217 |
| 2009/0043637 A1* | 2/2009 | Eder | G06Q 10/067 705/35 |
| 2012/0233118 A1* | 9/2012 | Holt | H04L 67/06 707/620 |

(Continued)

OTHER PUBLICATIONS

Maqsood, Rutba; Shahabuddin, Nalia; Upadhyay. A Scheme for Detecting Intrusions and Minimizing Data Loss in Virtual Networks. 2014 International Conference on Computational Intelligence and Communication Networks. https://ieeexplore.ieee.org/stamp/stamp.jsp?tp=&arnumber=7065580 (Year: 2014).*

(Continued)

*Primary Examiner* — Jeremiah L Avery
(74) *Attorney, Agent, or Firm* — Edell, Shapiro & Finnan, LLC (57) ABSTRACT

Creating security enclaves includes determining one or more parameters of one or more applications and one or more services operating in the network. An optimal number of clusters for grouping the one or more applications and the one or more services is determined based on the one or more parameters. Then, the one or more applications and the one or more services are grouped into the clusters and one or more security enclaves are applied to each of the clusters so as to maximize operational security of the network.

20 Claims, 10 Drawing Sheets

(56) References Cited

U.S. PATENT DOCUMENTS

| | | | | |
|---|---|---|---|---|
| 2014/0237545 | A1* | 8/2014 | Mylavarapu | H04L 63/1433 726/3 |
| 2014/0331277 | A1* | 11/2014 | Frascadore | H04L 63/20 726/1 |
| 2015/0319185 | A1* | 11/2015 | Kirti | H01L 63/1416 726/23 |
| 2017/0063901 | A1* | 3/2017 | Muddu | H04L 63/1425 |
| 2017/0064749 | A1* | 3/2017 | Jain | H04L 61/256 |

OTHER PUBLICATIONS

Kozikowski, Piotr; Groh, Georg. Inferring Profile Elements from Publicly Available Social Network Data. 2011 IEEE Third International Conference on Privacy, Security, Risk and Trust. https://ieeexplore.ieee.org/stamp/stamp.jsp?tp=&arnumber=6113233 (Year: 2011).*

Zhu, Feng et al. Understanding and Minimizing Identity Exposure in Ubiquitous Computing Environments. 2009 6th Annual International Mobile and Ubiquitous Systems: Networking&Services, MobiQuitous. https://ieeexplore.ieee.org/stamp/stamp.jsp?tp=&arnumber=5326389 (Year: 2009).*

"Cisco Secure Enclaves Architecture", Cisco Systems, Inc., Design Guide, White Paper, C07-731204-00, Mar. 2014, 23 pages.

Joe Rolle, "Using Neural Networks for Classification Problems in Finance", A Senior Project presented to the Faculty of the Statistics Department, California Polytechnic State University, San Luis Obispo, In Partial Fulfillment of the Requirement for the Degree Bachelor of Science, Jun. 2010, 10 pages.

Sarcià et al., "A Statistical Neural Network Framework for Risk Management Process", ICSOFT SE, 2007, 10 pages.

* cited by examiner

| | CLUSTER 1 | CLUSTER 2 | CLUSTER 3 | CLUSTER 4 | CLUSTER 5 | CLUSTER 6 | CLUSTER 7 | CLUSTER 8 |
|---|---|---|---|---|---|---|---|---|
| APPLICATIONS | 1598 | 211 | 1304 | 4796 | 137 | 3252 | 1146 | 555 |
| PERSONALLY IDENTIFIABLE DATA DETECTED | | | | | | | | |
| YES | 78% | 0% | 2% | 0% | 82% | 79% | 94% | 44% |
| NO | 22% | 100% | 98% | 100% | 18% | 21% | 6% | 56% |
| DATA CLASSIFICATION FROM DOC CONTROL | | | | | | | | |
| HIGHLY CONFIDENTIAL | 36% | 0% | 5% | 0% | 99% | 99% | 67% | 0% |
| CONFIDENTIAL | 54% | 0% | 0% | 0% | 0% | 0% | 33% | 100% |
| INTERNAL | 0% | 0% | 16% | 100% | 1% | 0% | 0% | 0% |
| PUBLIC | 0% | 100% | 78% | 0% | 0% | 0% | 0% | 0% |
| AUTOMATED APPLICATION READINGS (PERFORMANCE) | | | | | | | | |
| CRITICAL | 0% | 0% | 10% | 1% | 0% | 0% | 0% | 7% |
| HIGH | 0% | 0% | 84% | 15% | 0% | 100% | 100% | 93% |
| MEDIUM | 100% | 16% | 2% | 47% | 0% | 0% | 0% | 0% |
| LOW | 0% | 69% | 4% | 37% | 100% | 0% | 0% | 0% |
| NOT RATED | 0% | 5% | 0% | 0% | 0% | 0% | 0% | 0% |
| SYSTEM TYPE | | | | | | | | |
| CORPORATE APP | 5% | 13% | 21% | 14% | 3% | 0% | 92% | 0% |
| DEVELOPMENT APP | 0% | 1% | 23% | 6% | 0% | 0% | 3% | 3% |
| LAB APP | 95% | 86% | 56% | 80% | 97% | 99% | 5% | 97% |

AUTOMATED SECURITY ENCLAVE GENERATION

TECHNICAL FIELD

The present disclosure relates to network security.

BACKGROUND

Cybersecurity and, in particular, network security is a rapidly developing field with ever changing attacks and risks. In order to mitigate the risk of attacks, some networks are designed with security enclaves that separate network devices, applications, and/or services into different security enclaves. Then, if a network is attacked, the attack may be confined within a specific enclave, instead of spreading throughout the network. Moreover, different security controls can be applied to the different enclaves.

DESCRIPTION OF EXAMPLE EMBODIMENTS

Overview

Techniques are provided herein for creating security enclaves. These techniques may be embodied as a method, a system, and instructions in a computer-readable storage media to perform the method. According to one example embodiment, creating security enclaves includes, determining one or more parameters of one or more applications and one or more services operating in a network. An optimal number of clusters for grouping the one or more applications and the one or more services are determined based on the one or more parameters. Then, the one or more applications and the one or more services are grouped into the clusters and one or more security enclaves are applied to each of the clusters, so as to maximize operational security. In other words, an application (and service) is placed into a security enclave and a policy can be applied to the enclave to maximize security.

Example Embodiments

Presented herein are techniques for automatically creating security enclaves to increase or maximize operational security of a network. The enclaves segment portions of the network, such as applications or services operating on an enterprise network, so that security policies can be applied to hundreds or thousands of unique applications quickly, efficiently, and accurately. Generally, the techniques presented herein provide a programmatic classification of network applications and services that can be used in network security to automatically apply security enclaves to network applications and services. The security enclaves are created by determining risk parameters of network applications and services, and grouping the applications and services with similar risk parameters or profiles (the parameters of a single application or service may be collectively referred to as a risk profile). Artificial neural networks, such as self-organizing maps, can be used to categorize applications and services based on their risk parameters. Although the techniques presented herein may be mostly applied to non-infected hosts in an enterprise network as a preventative security measure, the techniques can also be applied to cloud-based applications, IoT devices, Fog edge systems, and infrastructure devices. Moreover, in some instances, the techniques presented herein may be applied to a single device or network (e.g., to segment applications into enclaves, such as in a vehicle computer/network), a single software container (e.g., to micro-segment a container), and/or used to test the accuracy or efficiency of preexisting security enclaves.

Typically, applications with similar risk parameters will have similar protection needs. Consequently, as a result of the techniques provided herein, security policies can be quickly and efficiently applied to any and all applications and services operating in an enterprise network. For example, if 7,000 applications are operating in an enterprise network, the 7,000 applications may be grouped into eight enclaves so that a small number (e.g., eight) of security policies can be applied to the 7,000 applications. Without these techniques, the security policies would need to be applied to each application individually and/or the applications would need to be manually categorized or sorted into enclaves. Each of these tasks is extremely burdensome and tedious. Moreover, if applications are manually identified for enclaving, a security engineer must rely on factors which estimate the impact of loss and likelihood of an attack to determine the severity of threats and, consequently, may not always group applications accurately. In fact, a security engineer may not be able to notice similarities that can reduce 7,000 applications into a small number of groups.

Figure 1:
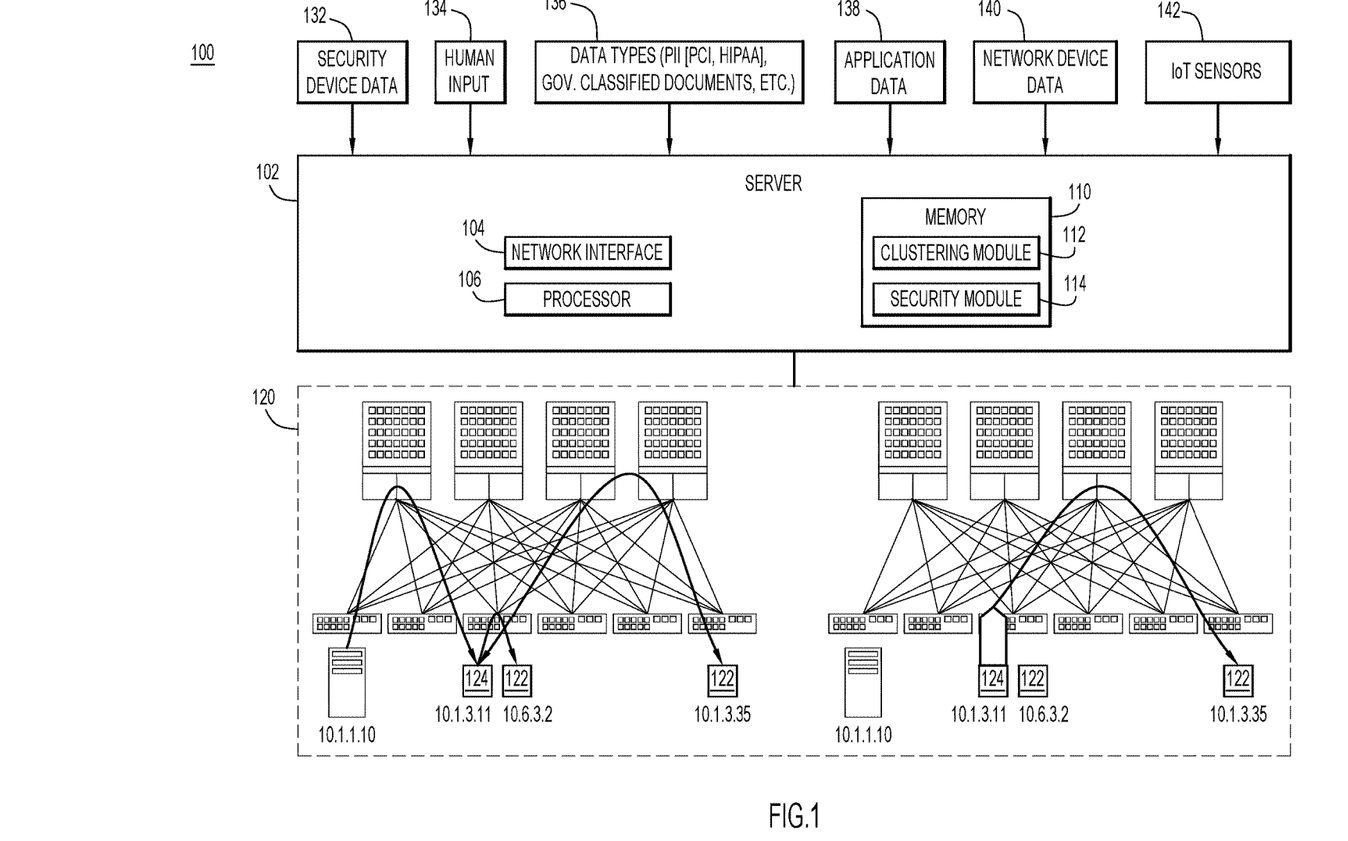
FIG. 1 is a block diagram illustrating a networking environment in which security enclaves may be created, according to an example embodiment.

Reference is now made to FIG. 1, which illustrates a network environment 100 in which enclave creation and other such methods presented herein may be employed, according to an example embodiment. In the depicted embodiment, the network environment 100 illustrates an enterprise network 120 with a number of Internet Protocol (IP) addresses (e.g., 10.1.1.10, 10.1.3.11, etc.). Applications and services, such as applications 122 and services 124 may reside and/or operate at the various IP addresses such that computing nodes operating in the network 120 can utilize the applications 122 and services 124. However, this arrangement (e.g., three applications 122 and two services 124 operating on the network 120) is only shown for simplicity. In other embodiments, the network 120 may be any desirable size. In fact, in some embodiments, the techniques presented herein may provide improved results as the number of applications and services operating on the network increases. Additionally, in other embodiments, enclave creation and other such methods presented herein need not be employed in or over a network and, instead, may be employed for any device, virtual system, or software container. For example, software containers residing in a hypervisor or operating system may be segmented using the techniques described herein.

Network environment 100 also includes a virtual or physical server 102, which includes a network interface 104 (e.g., one or more network interface cards), a processor 106, and a memory 110. The network interface 104 provides connectivity to network 120 and/or the Internet, such that the server may receive or retrieve a variety of data, including security device data 132, human input data 134, various data types 136, application data 138, network device data 140, and data from Internet of Things sensors 142. The processor 104 is configured to execute instructions stored on memory 110. For example, the memory 110 includes a number of software modules and/or engines, including a clustering module 112 and a security module 114, and the processor 104 is configured to execute instructions stored on each of these modules or engines. More specifically, the clustering module 112 is configured to cause the processor 106 to categorize and cluster various applications or services operating on the network 120 and the security module 114 is configured to cause the processor 106 to create, apply, and/or indicate security enclaves for the various clusters. In at least some embodiments, the security module 114 may be or include software defined networking (SDN) controllers, a security device/application, and/or one or more application orchestrators.

The memory 110 may also be configured to store any data retrieved or received from devices or data sources within the network 120 or related to the network 120 (e.g., IoT sensors 142), instructions for determining risk profiles, instructions for determining a number of clusters and/or any other data. Generally, memory 110 may include read only memory (ROM), random access memory (RAM), magnetic disk storage media devices, optical storage media devices, flash memory devices, electrical, optical or other physical/tangible (e.g., non-transitory) memory storage devices. Thus, in general, the memory 110 may be or include one or more tangible (non-transitory) computer readable storage media (e.g., a memory device) encoded with software comprising computer executable instructions. For example, memory 110 may store instructions that may be executed by processor 106 to create security enclaves that maximize operational security, as described below with reference to the figures. In other words, memory 110 may include instructions, that when executed by one or more processors, cause the one or more processors to carry out the operations described below in connection with the figures.

Moreover, although each module described herein, such as the clustering module 112 and the security module 114 is shown stored in memory 110, each module described herein, may be embodied by hardware, or a combination of hardware and software. For example, each module may include and/or initiate execution of an application specific integrated circuit (ASIC), a Field Programmable Gate Array (FPGA), a circuit, a digital logic circuit, an analog circuit, a combination of discrete circuits, gates, or any other type of hardware, or combination thereof. Accordingly, as used herein, execution of a module by processor 106 can also refer to logic based processing by the module that is initiated directly or indirectly by the processor 106 to complete a process or obtain a result. Alternatively or additionally, each module can include memory hardware, such as at least a portion of memory 110, for example, that includes instructions executable by processor 106 to implement one or more of the features of the module. When any one of the modules includes instructions stored in memory and executable by the processor 106, the module may or may not include a processor. In some examples, each module may include only memory storing instructions executable with the processor 106 to implement the features of the corresponding module without the module including any other hardware.

Figure 2:
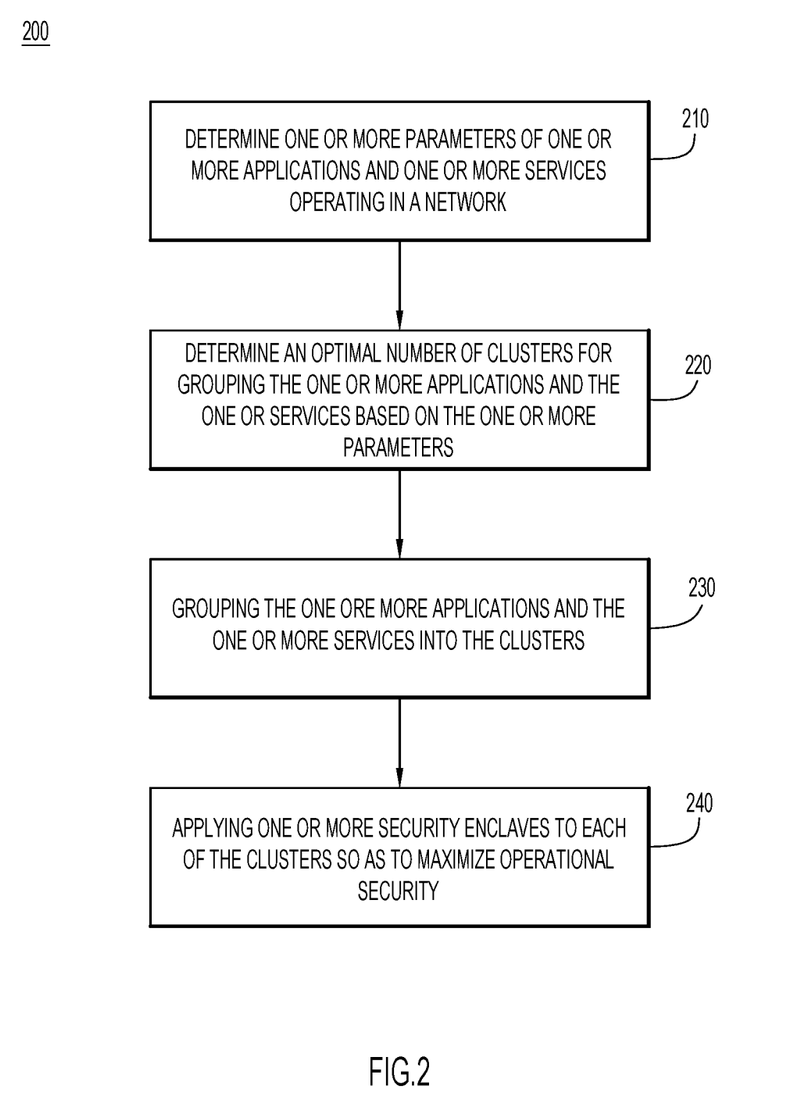
FIG. 2 is a high-level flowchart illustrating a process for creating security enclaves, according to an example embodiment.

Now referring to FIG. 2, a flowchart of a method 200 performed by server 102, for example, for creating and/or applying security enclaves in order to maximize operational security, according to an example embodiment, is now described. Reference is also made to FIG. 1 for purposes of the description of FIG. 2. Initially, at step 210, one or more parameters of one or more applications and one or more services operating in a network (e.g., network 120) are determined. The risk parameters are determined based on characteristics of the applications and services which, in turn, may be determined in view of data retrieved or received from various data inputs, including data automatically retrieved from Internet-based resources and data input manually by network administrators and business managers. Collectively, the risk parameters for a single application or service may define a risk profile for that application or service. As is described below in more detail, the parameters included in a risk profile may be analytically weighted and analyzed in order to identify applications or services with similar risk profiles. Consequently, the risk profiles can then be used to determine which applications and services should be protected with the same policies, how various applications and services need to be protected, and other such security indications, which, in turn, may indicate how security enclaves should be applied to the applications and services. In at least one embodiment, the clustering module 112 has successfully identified 5 risk profiles of 16 parameters on 722 applications with a statistical significance of 95%.

The parameters may include data parameters, criticality parameters, classification parameters, and/or any other parameters, such that the risk profile of an application or service describes unique characteristics related to factors that reflect the impact of loss of confidentiality, integrity, or availability of the system and data, such as the data on the system, function of the device/application/service, operating environment, and/or criticality. The data parameters may indicate whether the application or service stores personal information (e.g., whether personally identifiable data is detected in the application or service) and/or rate the classification of data associated with the application or service (e.g., highly confidential, confidential, internal, trade secret, protected intellectual property, public, etc.). The criticality parameters may indicate the impact or importance of the application of service with respect to operational performance. For example, an application may be determined to be critical, high importance, medium importance, low importance, or unrated. Classification parameters may classify the applications and services into specific types (e.g., corporate applications, development applications, or lab applications). In some embodiments, the determined parameters are stored in a spreadsheet or a comma separated values (CSV) file stored within the server 102, the clustering module 112, or any external spreadsheet or inventory system (e.g., the data can be exported). However, the parameters need not be stored in a spreadsheet or a CSV file and, in other embodiments, can be stored in any desirable manner.

As shown in FIG. 1, the data that is retrieved or received at server 102 and used to determine one or more parameters of the applications and services is not limited to data received via human input and may also include data from applications, network infrastructure and security devices, IoT sensors, and data classifications. Additionally or alternatively, risk parameters may be determined in view of markings that indicate the function of an application/service, the function of a device hosting the application/service, the operation environment (data center/edge device) of an application/service, and/or criticality. In other words, in at least some embodiments, applications and services are inventoried in view of any available data, instead of merely being inventoried based solely on data collected or input by a security architect.

At step 220, an optimal number of clusters is determined based on the parameters of the applications and services in the network. The optimal number indicates the number of groups that the applications and services should be grouped in to allow security enclaves to be applied in a manner that maximizes operational security in view of operational ease. Generally, the risk profiles (which include a set of risk parameters) can be fed into neural networks, such as self-organizing maps, which can determine logical groupings while iteratively increasing the specialization of each grouping. Consequently, the neural network can determine an optimal number of clusters by determining a number of clusters that minimizes intra-cluster variation (e.g., similarities of applications/services grouped in the same cluster) and maximizes inter-cluster variation (e.g., differences between applications/services grouped in different clusters) while also providing operational ease. In other words, the neural network will attempt to determine the optimal number of clusters by balancing operational ease (e.g., fewer clusters) with fitting the richness of the data (low intra-cluster variation). An example embodiment of determining the optimal number of clusters is described in further detail below in connection with FIGS. 4-8.

At step 230, the applications and services are grouped into the clusters. In some embodiments, the applications and services are grouped into the clusters as the optimal number of clusters is determined. Combining these steps may increase efficiency since the optimal number is determined based on whether the groupings minimize intra-cluster variation and/or maximize inter-cluster differences in view of operational ease. However, in other embodiments, the optimal number of clusters may be determined prior to grouping the applications and services. Regardless, once the applications and services are grouped into clusters, the applications and services will be, for the most part, grouped with other applications and services that have similar parameters (e.g., similar criticality). Additionally or alternatively, an application or service that is dissimilar from all of the other applications and services operating in the network may be grouped in its own cluster.

After the clustering is performed, one or more security enclaves is applied to each of the clusters so as to maximize operational security at step 240. Applying an enclave to a cluster, or a portion of a cluster (e.g., if multiple enclaves are applied to the same cluster), may subdivide the internal network to create a segment within the network. For example, upon analyzing 7000 applications, a neural network may recognize eight distinct archetypes and, thus, determine that the optimal number of clusters is eight. As or after the applications are grouped into these eight clusters, one or more enclaves may be automatically created and applied to each cluster. Additionally or alternatively, if preexisting enclaves exist, applying one or more enclaves to a cluster may involve placing the clusters, or portions thereof, into the preexisting enclaves. In a network environment like network environment 100, creating and applying enclaves to the cluster may be accomplished with network admission controls, internal firewalls (software-or hardware-based) at the network or host level, virtual local area networks (VLANs) and/or virtual private networks (VPNs). Additionally or alternatively, in application development, application provisioning, and/or application management environments, applications may be enclaved in any manner. For example, containers (e.g., Docker containers) may be enclaved by creating isolated environments for clusters of containers within an operating system or hypervisor (e.g., by leveraging LINUX kernel's ability to create isolated environments). In these isolated environments, each container may be assigned its own, mostly independent, runtime environment with Control Groups (cgroups) and namespaces. Each container then receives its own network stack and process space, as well as its instance of a file system.

In some embodiments, one or more enclave is automatically applied to a cluster based on the risk parameters that are shared by a certain threshold (e.g., a majority) of the applications or services included in that cluster. However, different parameters may require or correspond to different numbers of enclaves. For example, if all of the applications included in a first cluster reside in a first data center and contain non-confidential information, all of these applications can reside in the same enclave. By comparison, if the members of a second cluster each store critical data (e.g., customer data that would cause significant outages if compromised), each server in this cluster could be placed in its own enclave.

Figure 3:
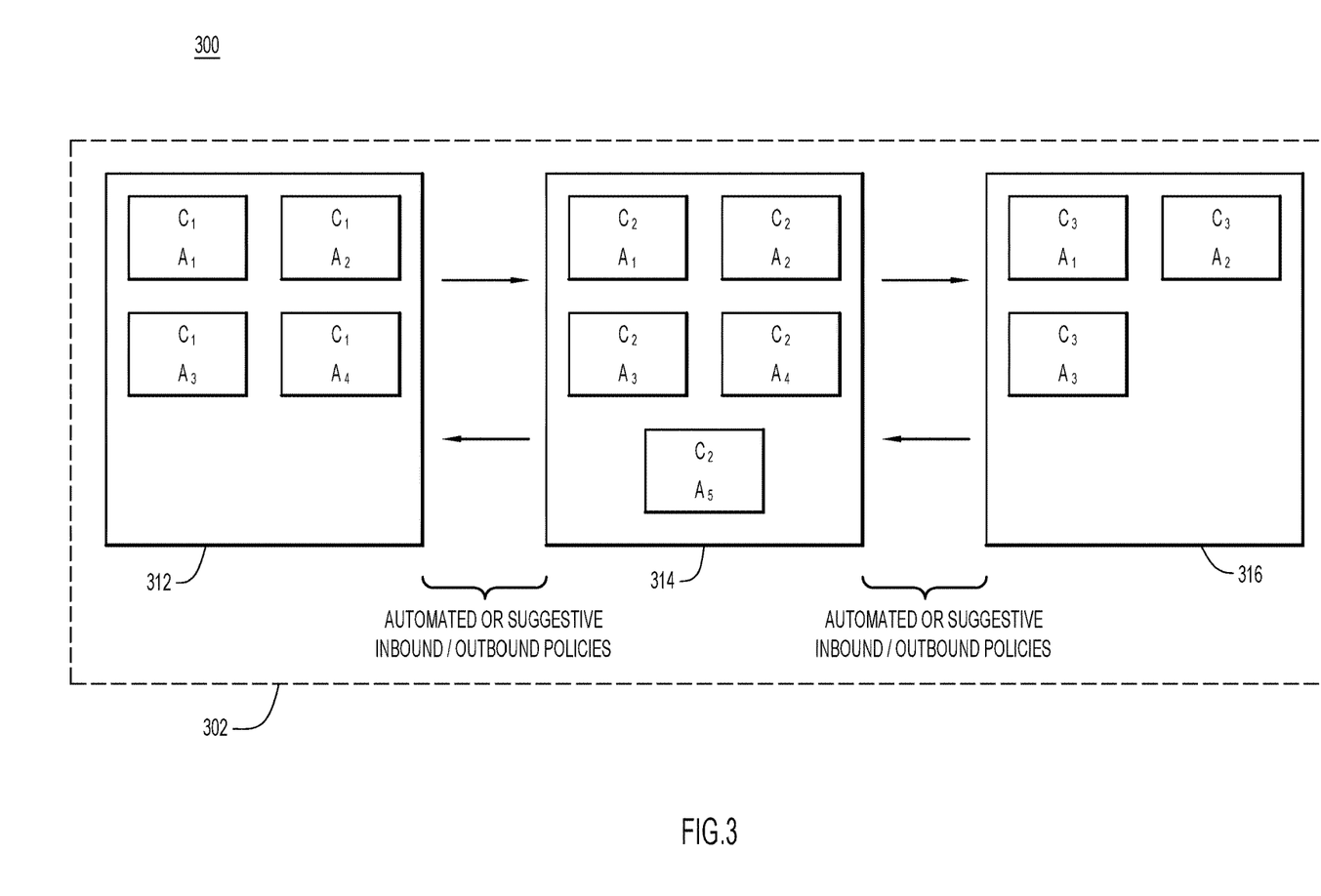
FIG. 3 is a diagram illustrating applied security enclaves, according to an example embodiment.

Now referring to FIG. 3, representation 300 illustrates a network 302 subsequent to the application of enclaves to applications (represented as A's) included in the network 302. In particular, a first enclave 312 has been applies to a first cluster $C_1$ that includes four different applications ($C_1A_1$, $C_1A_2$, $C_1A_3$, and $C_1A_4$), a second enclave 314 has been applied to a second cluster $C_2$ that includes five applications ($C_2A_1$, $C_2A_2$, $C_2A_3$, $C_2A_4$, and $C_2A_4$), and a third enclave 316 has been applied to a third cluster $C_3$ includes 3 applications ($C_3A_1$, $C_3A_2$, and $C_3A_3$). As is illustrated, by organizing these applications in this matter, inbound and outbound policies can be created and applied. Alternatively, the policies can be "suggested" to an administrator for verification prior to deployment. These policies can be applied by security module 114.

More generally, as or after an enclave is applied to a cluster, or a portion thereof, a protection mechanism (e.g., a set of security policies) may be applied to the applications within an enclave. In some embodiments, security policies are automatically generated in view of technical data gathered by the server and either suggested for application or automatically applied to the enclaves. For example, an SDN Controller could apply specific security policies to the enclaves with VLANs and/or specific port restrictions. Additionally or alternatively, security policies can be generated and applied manually (e.g., created and applied by a security engineer reviewing the enclaves). In any case, applying one or more security enclaves to a cluster allows the same security rule/policy or set of security rules/policies to be quickly and efficiently applied to each application included therein. In some embodiments, a security rule or a set of security rules is automatically applied to an enclave when a certain threshold (e.g., a majority) of the applications or services included in that enclave share the same risk parameter.

Figure 4:
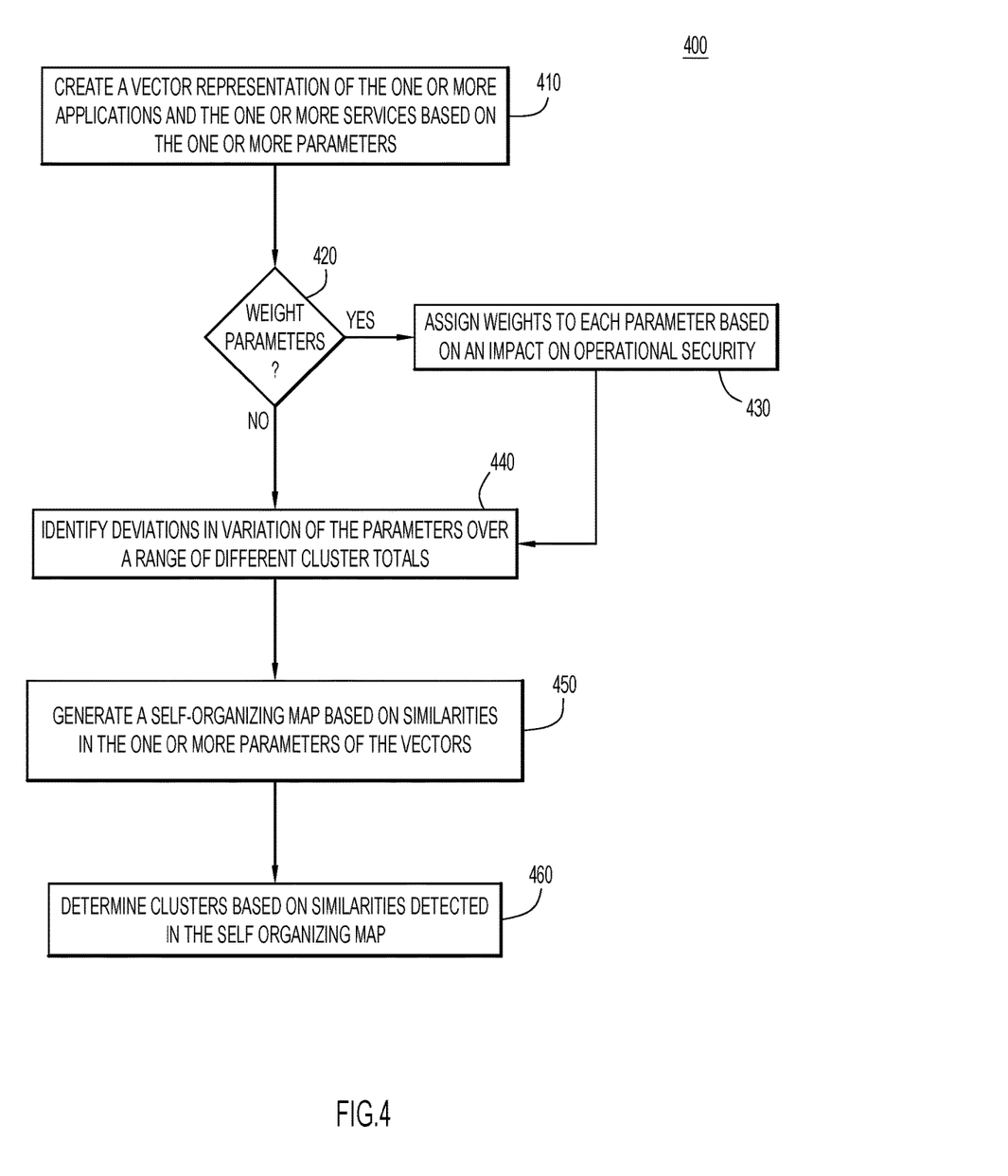
FIG. 4 is a flowchart illustrating a process for determining an optimal number of clusters for security enclaves and grouping applications and services into the clusters, according to an example embodiment.
Figure 5:
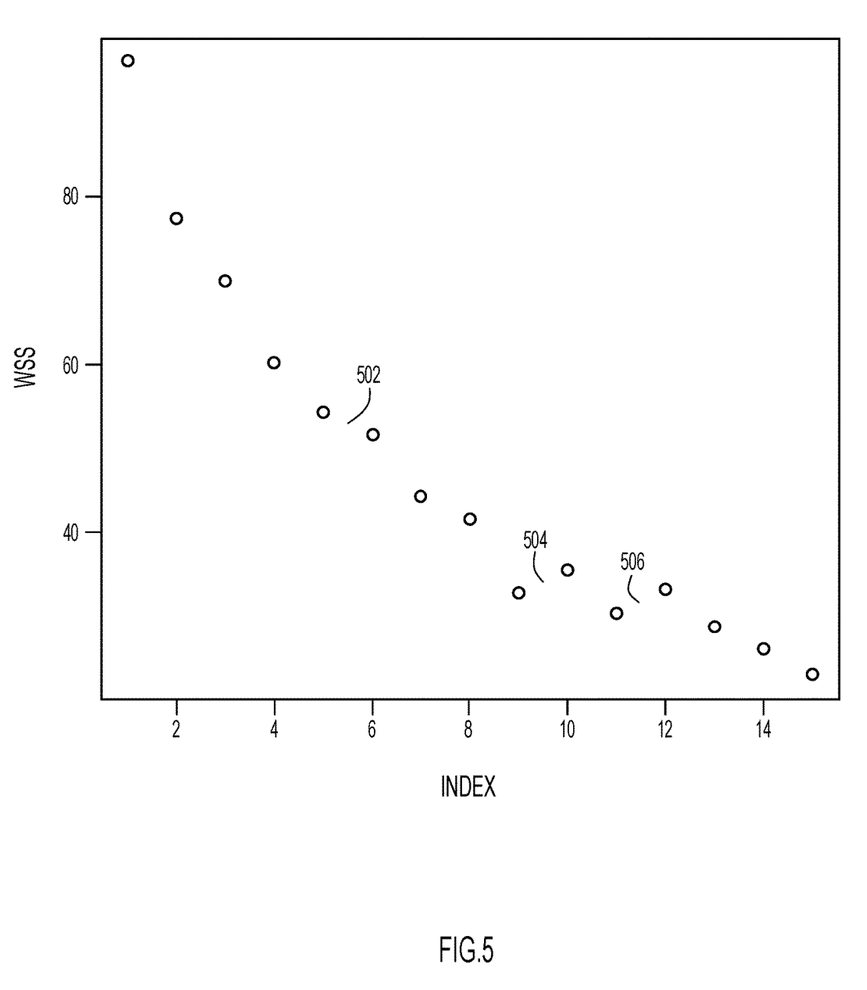
FIGS. 5, 6 and 7 are each graphical representations of a step of the method of FIG. 4, according to an example embodiment.
Figure 6:
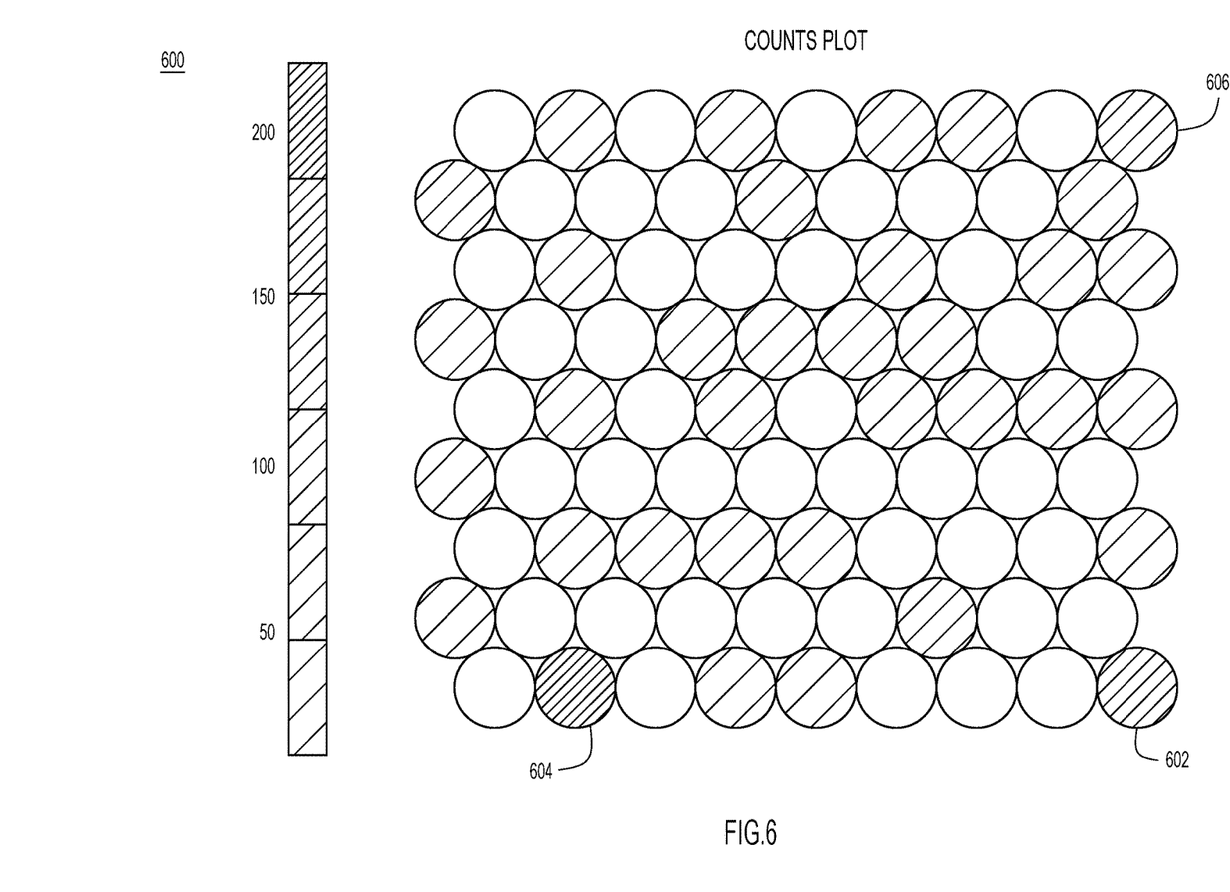
Figure 7:
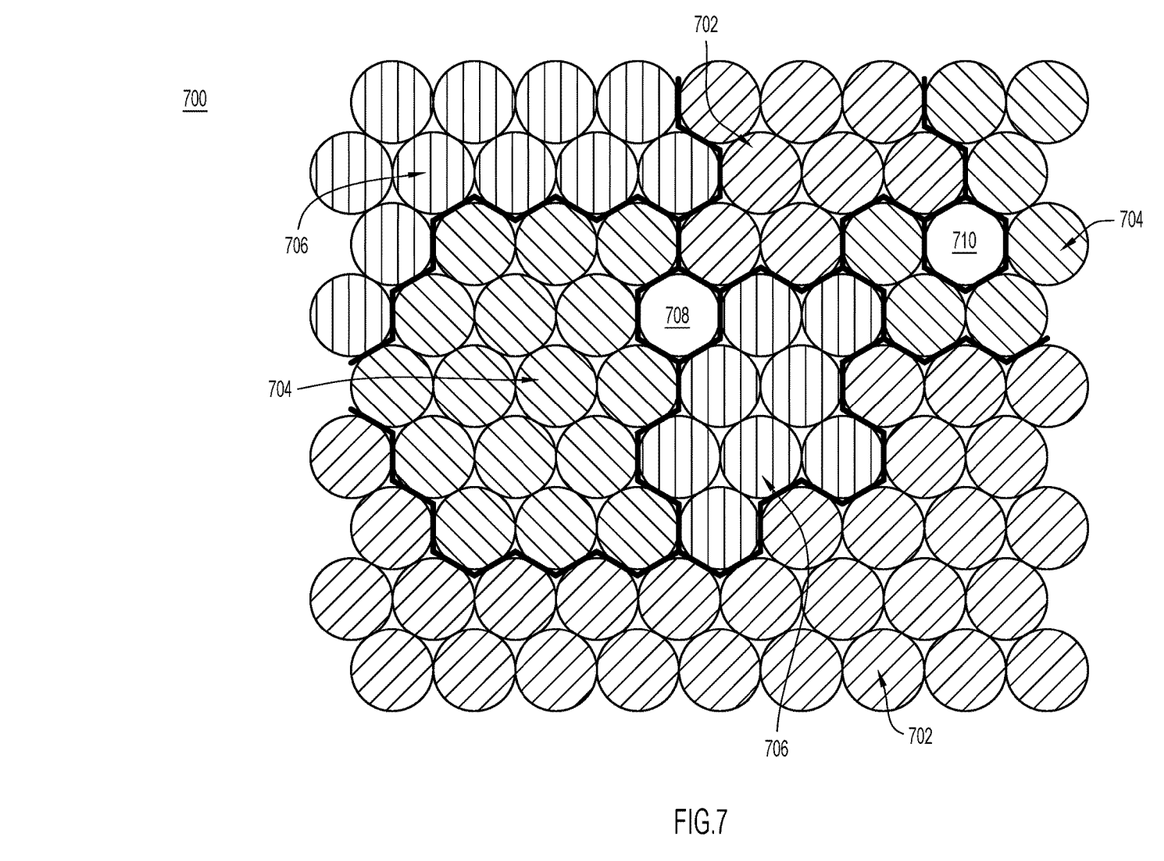

Now referring to FIGS. 4-7, a flowchart of a method 400 included in FIG. 4 is described with reference to graphical representations included in FIGS. 5-7. Reference is also made to FIGS. 1 and 2 for purposes of the description of FIGS. 4-7. Generally, method 400 is performed by server 102, for example, to determine an optimal number of clusters (e.g., at step 220 of method 200) and group the applications and the one or more services into the clusters (e.g., step 230), according to an example embodiment. The graphical representations included in FIGS. 5-7 illustrate one example manner of implementing certain steps of method 400. Specifically, FIG. 5 graphically represents one manner of implementing step 440, FIG. 6 graphically represents one manner of implementing step 450, and FIG. 7 graphically represents one manner of implementing step 460. In the example implementations of FIGS. 5-7, 723 applications were analyzed and grouped into clusters based on preexisting risk parameters with default weights; however, these implementations are merely an example and in other embodiments, any number of applications or services could be grouped, based on any parameters, using the steps shown and described in connection with FIG. 4. Moreover, in FIGS. 6 and 7, a 9×9 self-organizing map is utilized, but this map is merely an example and in other embodiments, any desirable self-organizing map could be utilized.

Now referring specifically to FIG. 4, method 400 utilizes a self-organizing map to organize the applications and services into an optimal number of self-organizing clusters. Initially, at step 410, a vector representation is created for each of the applications and services operating in the network based on the parameters included in the risk profile for each application and service. The vector is a multi-dimensional vector that accounts for any number of parameters of that application or service and, in at least some embodiments, the vector normalizes parameters into a multi-bit encoding which represents an application or service. In some embodiments, the parameters may be weighted, as decided at step 420. If so, the parameters are weighted based on their impact on operational security at step 430. For example, criticality may be determined to be more important than confidentiality if an enterprise's main priority is to be continually operational and the parameters may be weighted accordingly.

Regardless of whether the parameters are weighted, the vectors are analyzed, at step 440, to identify deviations in the variation of the parameters in a cluster over a range of different numbers of total clusters. More specifically, deviations in the amount of intra-cluster parameter variation as total number of clusters is incrementally increased are identified. These deviations may indicate the optimal number of groups or clusters by indicating the point at which an additional cluster is statistically significant (e.g., the point at which an additional cluster no longer decreases or slows the rate of decrease of the intra-cluster variation). These deviations are described in further detail below in connection with FIG. 5. At steps 450 and 460, the vectors are categorized using a software library that generates self organizing maps (e.g., competitive learning algorithms) that can be applied to group like vectors. Specifically, at step 450, each vector (representative of the applications and services) is mapped to a node included in the self-organizing map based on similarities found between the vectors (which represent similarities of the determined parameters of each application or service). Consequently, similar applications/services will be grouped together at the same node, as is shown in more detail in FIG. 6. Then, at step 460, clusters can be determined based on the similarities (and differences) between nodes, as is shown in more detail in FIG. 7.

Now referring to FIG. 5, graphical representation 500 illustrates an example manner of identifying variation, as described above in connection with step 440. In graphical representation 500 the "within groups sum of squares" (WSS) of the vectors (which represent the risk parameters) within the clusters is plotted against the total number of clusters. Any upward deviations (e.g., upward bends) in the WSS indicate that the variation within the clusters is increasing as the number of clusters increases and/or decreasing at a lesser rate as compared to previous incremental increases in the number of clusters. These upward bends suggest that the optimal number of clusters may be a total number of clusters prior to the deviation. In other words, upticks in the WSS indicate that an incremental increase in the number of groups will only worsen the results, such as by adding an additional cluster without a clear delineation of another logical grouping of applications/services. In the depicted embodiment, a first upward bend is apparent at 502, between five and six clusters, a second upward bend is apparent at 504, between nine and ten clusters, and third bend is apparent at 506, between eleven and twelve clusters. Consequently, the optimal number of clusters may be five, nine, or eleven clusters. In some embodiments, an optimal and backup number of clusters may be presented to a security architect, who may then select any number of clusters. Additionally or alternatively, the optimal number of clusters may be automatically selected in view of operational ease. In this instance, five clusters is selected as the optimal number of clusters because it significantly minimizes variation in the clusters (e.g., as compared to four clusters) while also ensuring operational ease (e.g., compared to nine or eleven clusters).

Now referring to FIG. 6, as or after deviations are identified (e.g., at step 440), a self-organizing map 600 is formed, created, or otherwise generated based on similarities in the one or more parameters (e.g., step 450) of the applications. In FIG. 6, each application was grouped in to one of 81 nodes (9×9 map) based on the similarity of applications in each node (e.g., as suggested by comparing the ratios of the single value decomposition). Any number of applications may be mapped to each of the nodes, such that many nodes may have one or zero applications while other nodes may include hundreds of applications. For example, in the illustrated embodiment, increased shading or hatching indicates an increased number of application. As specific examples, node 602 includes approximately 150 applications, node 604 includes 200+applications, and node 606 includes approximately 75 applications. Any nodes shown without shading include only a single application.

Reference is now made to FIG. 7. As or after the applications are mapped to nodes included in the self-organizing map (e.g., step 350), the nodes can be grouped into clusters as shown in map 700. In this example embodiment, the identified deviations indicated the optimal number of clusters to be five. Accordingly, the nodes in the map 700 are divided or grouped into five clusters based on similarities between the vectors that represent the parameters of applications included in the nodes. The clusters are determined by the neural networks and are not necessarily contiguous within the self-organizing map. In this particular embodiment, a first cluster 702 includes two non-contiguous portions of the map 700 (shown in a first hashing), a second cluster 704 includes two non-contiguous segments (shown in a second hashing), a third cluster 706 includes two non-contiguous segments (shown in a third hashing) and a fourth cluster 708 and fifth cluster 710 each include a single node. In some embodiments, once the self-organizing map segments the nodes into clusters, a CSV file that lists each application or service and its cluster assignment may be output; however, in other embodiments, the cluster assignments may be output in any manner or need not be output at all (e.g., the assignments may simply be stored). In embodiments where the cluster assignments are output, a matrix codebook of vectors may also be output to help security engineers categorize the clusters.

Figure 8:
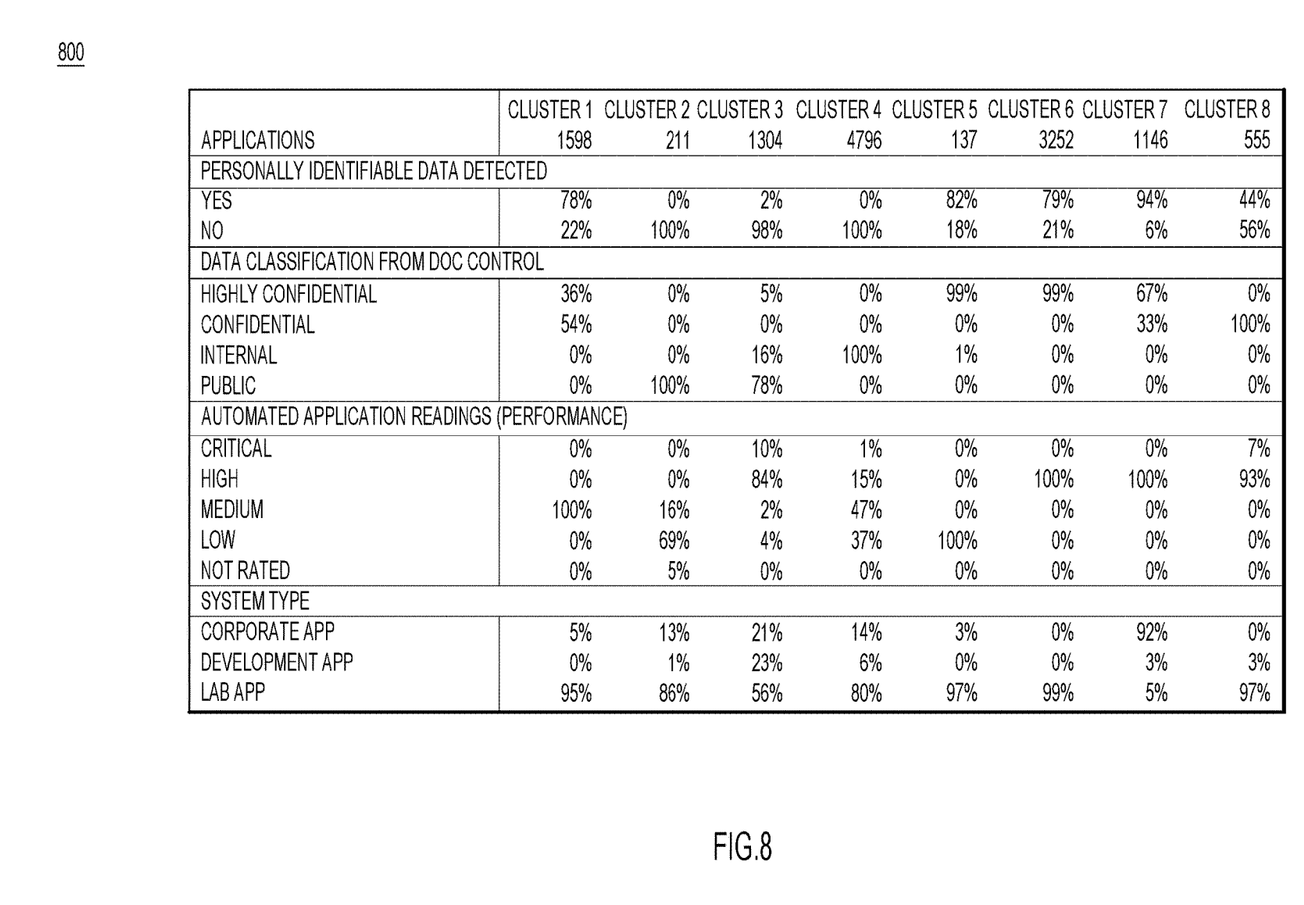
FIG. 8 is a graphical representation illustrating the parameters of applications included in clusters, according to an example embodiment.

Now referring to FIG. 8, but with continued reference to FIG. 7, generally, the clusters may be determined in any desirable manner. However, in at least some embodiments, the clusters are determined by sorting the nodes based on one or more defining characteristic (e.g., a specific risk parameter). For example, all of the nodes included in first cluster 702 may include applications with a medium criticality rating, all of the nodes included in the second cluster 704 may include public data without personally identifiable data, and so forth. In FIG. 8, an example graphical representation 800 illustrates the parameters of applications that have been grouped into eight clusters. Notably, 100% of the applications included in Cluster 1 have medium criticality, while 100% of the applications in Cluster 5 have low criticality and 100% of the applications in Clusters 6 and 7 have high criticality. However, the applications in Clusters 6 and 7 are distinguished because 99% of the applications in cluster 6 have highly confidential data and 94% of the applications in Cluster 7 have personally identifiable data (Cluster 7 is focused on high criticality applications with personally identifiable data).

Since Clusters 6 and 7 include high criticality applications, multiple enclaves could be applied to these clusters. Similarly, multiple enclaves could be applied to Cluster 3 because 84% of the applications in Cluster 3 have a high criticality, Cluster 5 because 99% of the applications in Cluster 5 include highly confidential data and 82% include personally identifiable data, and Cluster 8 because 100% of the applications included confidential data. By comparison, Cluster 1 includes 100% medium criticality applications, Cluster 2 includes only applications with public and non-personal data, and Cluster 4 only includes applications with internal and non-personal data. Consequently, Clusters 1, 2 and 4 may pose less of a risk and one enclave, with varying levels of security (e.g., Cluster 4 may require more robust security policies, as compared to Cluster 2) may be applied to each of these clusters.

Figure 9:
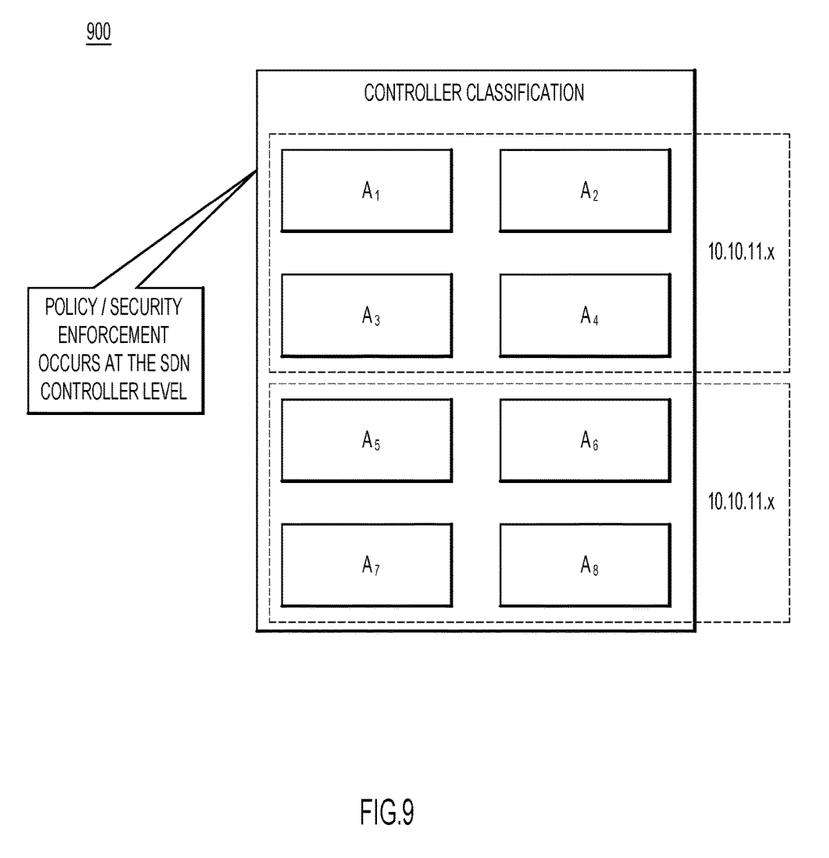
FIGS. 9 and 10 are diagrams that illustrate the enforcement of security policies at various layers of an enterprise network, according to example embodiments.
Figure 10:
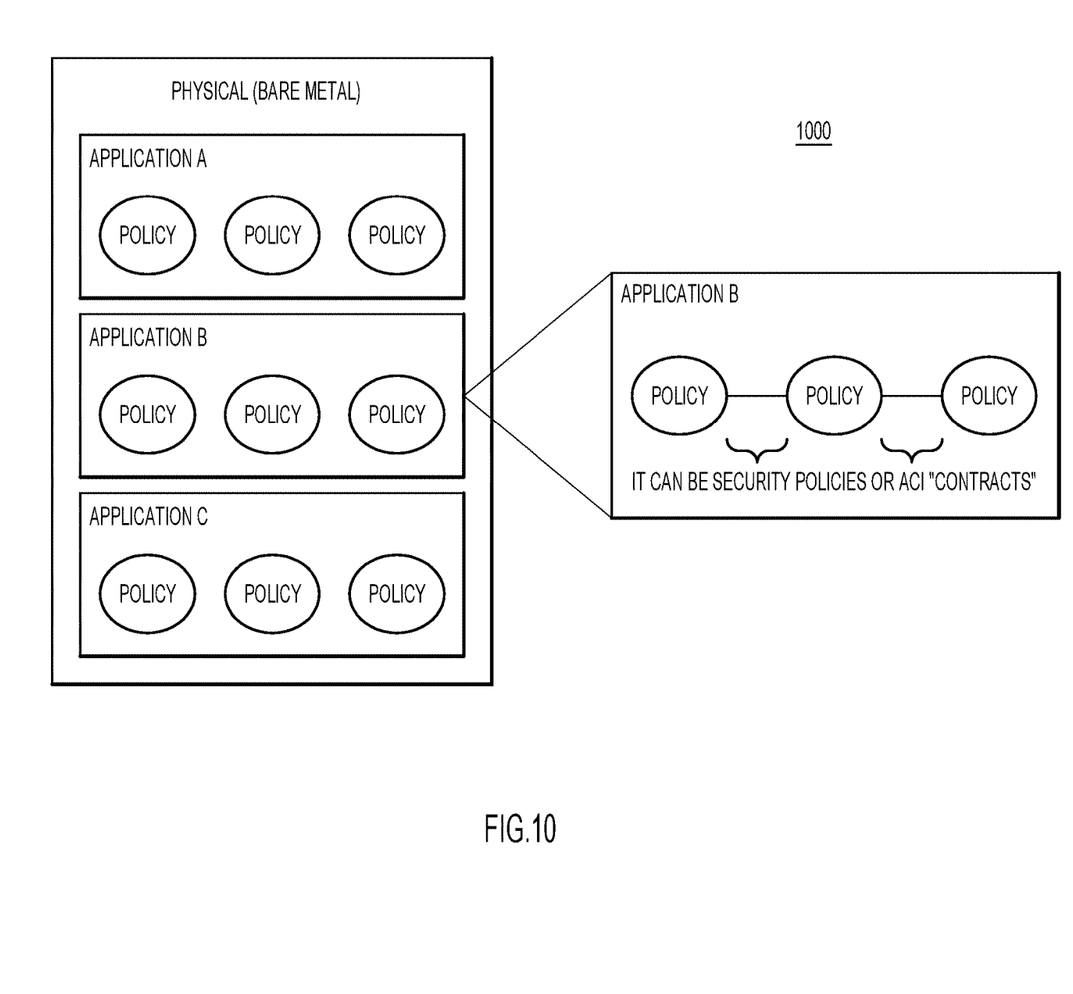

Reference is now made to FIGS. 9 and 10 for a description of how security policies may be enforced at any layer of the enterprise network. Reference is also made to FIG. 1 for the description of FIGS. 9 and 10. FIG. 9 depicts policies being deployed at the network layer (e.g., Layers 2-4) while FIG. 10 depicts policies being deployed at the application layer (e.g., Layer 7, within each application, virtual machine (VM), or Linux container (e.g., Docker)). Notably in the diagram 900 included in FIG. 9, security policies are applied to applications operating at different IP addresses in the network at the network layer, such as by an SDN Controller included in or acting as the security module 114. In the depicted embodiment, Applications $A_1$-$A_4$ are operating at 10.10.11.x and Applications $A_5$-$A_8$ are operating at 10.10.10.x; however, all of these applications are clustered in the same cluster and the same enclave is applied to each. Consequently, the security module 114 can apply the same security policies to each application at the network layer. By comparison, in the diagram 1000 included in FIG. 10 policies are applied at the application layer. In the depicted embodiment, the same policies are applied to Application A, B, and C.

The techniques provided herein provide a number of advantages. Most notably, the techniques provided utilize neural networks to automatically create and apply security enclaves. These techniques can be used to build security profiles, as a preventative measure, for at least non-infected hosts, cloud-based applications, IoT devices, Fog edge systems, and infrastructure devices as a preventive measure. Currently, there are no tools or methodologies available to help a network security engineer categorize applications and services for security enclaves. Consequently, the techniques provided herein solve a problem that is unique to and necessarily rooted in computing. Moreover, instead of simply placing similar applications into enclaves, the techniques presented herein determine an optimal number of clusters that will minimize variation while preserving operational efficiency. The techniques presented herein would be extremely helpful for network security architects and consultants who need to build risk profiles of large networks, saving both time and computing resources, especially as the number of applications and services operating in a network increases.

To summarize, in one form, a method is provided comprising: determining one or more parameters of one or more applications and one or more services operating in a network; determining an optimal number of clusters for grouping the one or more applications and the one or more services based on the one or more parameters; grouping the one or more applications and the one or more services into the clusters; and applying one or more security enclaves to each of the clusters, so as to maximize operational security of the network.

In another form, a system is provided comprising: a network in which one or more applications and one or more services are operating; a server having connectivity to the network, the server configured to: determine one or more parameters of the one or more applications and the one or more services operating in the network; determine an optimal number of clusters for grouping the one or more applications and the one or more services based on the one or more parameters; group the one or more applications and the one or more services into clusters; and apply one or more security enclaves to each of the clusters, so as to maximize operational security of the network.

In yet another form, a non-transitory computer-readable storage media is provided that is encoded with software comprising computer executable instructions and when the software is executed operable to: determine one or more parameters of one or more applications and one or more services operating in a network; determine an optimal number of clusters for grouping the one or more applications and the one or more services based on the one or more parameters; group the one or more applications and the one or more services into clusters; and apply one or more security enclaves to each of the clusters, so as to maximize operational security of the network.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:
1. A method comprising:
 determining one or more risk parameters that define risk profiles of one or more applications and one or more services operating in a network;

determining an optimal number of clusters for grouping the one or more applications and the one or more services based on the risk profiles;

grouping the one or more applications and the one or more services into the optimal number of clusters based on the risk profiles; and applying one or more security enclaves to each of the clusters.

2. The method of claim 1, wherein the clusters are self-organizing clusters configured to group the one or more applications and one or more services.

3. The method of claim 1, wherein the one or more applications and the one or more services are grouped into the clusters by a self-organizing map.

4. The method of claim 3, wherein determining further comprises:

creating a vector representative of each of the one or more applications and each of the one or more services based on the risk profiles; and generating the self organizing map based on one or more similarities in the vectors.

5. The method of claim 1, further comprising:

assigning weights to each of the one or more risk parameters based on an impact on operational security of the network.

6. The method of claim 1, wherein the optimal number of clusters is determined based on deviations in intra-cluster variation.

7. The method of claim 1, wherein applying the one or more security enclaves further comprises:

segmenting the network or inserting at least a portion of the cluster into a preexisting segment of the network.

8. The method of claim 1, wherein the one or more risk parameters are determined based on data collected from at least one of security devices, applications, network devices, and Internet of Things sensors.

9. A system comprising:

a network in which one or more applications and one or more services are operating;

a server having connectivity to the network, the server configured to:

determine one or more risk parameters that define risk profiles of the one or more applications and the one or more services operating in the network;

determine an optimal number of clusters for grouping the one or more applications and the one or more services based on the risk profiles;

group the one or more applications and the one or more services into the optimal number of clusters based on the risk profiles; and apply one or more security enclaves to each of the clusters.

10. The system of claim 9, wherein the one or more applications and one or more services are grouped into the clusters by a self-organizing map.

11. The system of claim 10, wherein, in determining the optimal number of clusters, the server is further configured to:

create a vector representative of each of the one or more applications and each of the one or more services based on the risk profiles; and generate the self organizing map based on one or more similarities in the vectors.

12. The system of claim 9, wherein the server is further configured to:

assign weights to each of the one or more risk parameters based on an impact on operational security.

13. The system of claim 9, wherein the optimal number of clusters is determined based on deviations in intra-cluster variation.

14. The system of claim 9, wherein in applying the one or more security enclaves, the server is further configured to:

segment the network or insert at least a portion of the cluster into a preexisting segment of the network.

15. A non-transitory computer-readable storage media encoded with software comprising computer executable instructions and when the software is executed operable to:

determine one or more risk parameters that define risk profiles of one or more applications and one or more services operating in a network;

determine an optimal number of clusters for grouping the one or more applications and the one or more services based on the risk profiles;

group the one or more applications and the one or more services into the optimal number of clusters based on the risk profiles; and apply one or more security enclaves to each of the clusters.

16. The non-transitory computer-readable storage media of claim 15, wherein the one or more applications and the one or more services are grouped into the clusters by a self-organizing map.

17. The non-transitory computer-readable storage media of claim 16, wherein the instructions operable to determine the optimal number of clusters are further operable to:

create a vector representative of each of the one or more applications and each of the one or more services based on the risk profiles; and generate the self organizing map based on one or more similarities in the vectors.

18. The non-transitory computer-readable storage media of claim 15, wherein the instructions are further operable to:

assign weights to each of the one or more risk parameters based on an impact on operational security.

19. The non-transitory computer-readable storage media of claim 15, wherein the optimal number of clusters is determined based on deviations in intra-cluster variation.

20. The non-transitory computer-readable storage media of claim 15, wherein the instructions operable to apply the one or more security enclaves are further operable to:

segment the network or insert at least a portion of the cluster into a preexisting segment of the network.

* * * * *